US012058446B2

(12) United States Patent
Wu et al.

(10) Patent No.: US 12,058,446 B2
(45) Date of Patent: Aug. 6, 2024

(54) METHOD AND SYSTEM OF IMAGE PROCESSING WITH COMPOSITION AND DISPLAY OF REGIONS OF INTEREST (71) Applicant: ZTE Corporation, Shenzhen (CN)

(72) Inventors: Zhao Wu, Shenzhen (CN); Ming Li, Shenzhen (CN); Ping Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/276,572

(22) PCT Filed: Jul. 23, 2019

(86) PCT No.: PCT/CN2019/097355
§ 371 (c)(1),
(2) Date: Mar. 16, 2021

(87) PCT Pub. No.: WO2020/057249
PCT Pub. Date: Mar. 26, 2020

(65) Prior Publication Data
US 2022/0053127 A1 Feb. 17, 2022

(30) Foreign Application Priority Data
Sep. 19, 2018 (CN) .......................... 201811095593.9

(51) Int. Cl.
H04N 23/698 (2023.01)
G06T 7/11 (2017.01)
(Continued)

(52) U.S. Cl.
CPC ............. H04N 23/698 (2023.01); G06T 7/11 (2017.01); H04N 21/234345 (2013.01); H04N 21/440245 (2013.01); H04N 21/816 (2013.01)

(58) Field of Classification Search
CPC ....... H04N 5/23238; H04N 21/234345; H04N 21/440245; H04N 21/816; H04N 19/119;
(Continued)

(56) References Cited
U.S. PATENT DOCUMENTS 6,643,414 B1 * 11/2003 Kadono ......... H04N 21/234318
375/E7.076
2012/0140067 A1 * 6/2012 Crossen ................... H04N 7/18
382/173
(Continued)

FOREIGN PATENT DOCUMENTS

CN 1889686 A 1/2007
CN 101521745 A 9/2009
(Continued)

OTHER PUBLICATIONS

International Search Report for corresponding application filed Jul. 23, 2019; Mail date Oct. 24, 2019.
(Continued)

Primary Examiner — Richard T Torrente
(74) Attorney, Agent, or Firm — CANTOR COLBURN LLP (57) ABSTRACT Provided are an image processing method, apparatus and system, a network device, a terminal and a storage medium. The method includes: acquiring composition indication information for indicating a composition and display manner of regions of interest (ROIs) in a video image; and generating a media stream of the video image based on at least the composition indication information, i.e., writing the composition indication information into a code stream of the video image.

17 Claims, 7 Drawing Sheets (51) Int. Cl.
*H04N 21/2343* (2011.01)
*H04N 21/4402* (2011.01)
*H04N 21/81* (2011.01)

(58) Field of Classification Search
CPC ............. H04N 19/172; H04N 21/4728; H04N 19/167; H04N 19/70; H04N 21/2343; H04N 21/4402; H04N 19/184
See application file for complete search history.

(56) References Cited

U.S. PATENT DOCUMENTS

| | | | | |
|---|---|---|---|---|
| 2012/0201306 | A1* | 8/2012 | Kang | H04N 21/4345 375/E7.243 |
| 2014/0051513 | A1* | 2/2014 | Polo | A63F 13/65 463/31 |
| 2014/0052549 | A1* | 2/2014 | Dollens | G06T 19/00 705/27.2 |
| 2014/0313320 | A1* | 10/2014 | Kikuchi | G06V 10/225 348/133 |
| 2015/0124170 | A1 | 5/2015 | Kenmochi | |

FOREIGN PATENT DOCUMENTS

| | | |
|---|---|---|
| CN | 102265626 A | 11/2011 |
| CN | 105578204 A | 5/2016 |
| CN | 106331732 A | 1/2017 |
| CN | 106664443 A | 5/2017 |
| CN | 108322727 A | 7/2018 |
| JP | 2006352539 A | 12/2006 |

OTHER PUBLICATIONS

European Search Report for corresponding 19 862 435.5, Mail date Oct. 8, 2021.
Goksel Dedeoglu, "Region of Interest (ROI) SEI message", Texas Instruments Inc, Oct. 10-19, 2012.
Media Tek, Signaling of VR Viewports and POI's in DASH, Media Tek, Oct. 2016.
European Office Action for corresponding applciation 19 862 435.5 dated Mar. 27, 2023.

* cited by examiner

METHOD AND SYSTEM OF IMAGE PROCESSING WITH COMPOSITION AND DISPLAY OF REGIONS OF INTEREST

CROSS-REFERENCE TO RELATED APPLICATION

This application claims priority of Chinese Patent Application No. 201811095593.9, filed with the Chinese Patent Office on Sep. 19, 2018 and entitled "Image Processing Method, Apparatus and System, Network Device, Terminal and Storage Medium", which is incorporated herein by reference in its entirety.

TECHNICAL FIELD

Some embodiments of the present disclosure relate to, but are not limited to, the field of image coding and decoding technologies, and in particular, to, but are not limited to, an image processing method, apparatus and system, a network device, a terminal, and a storage medium.

BACKGROUND

Nowadays, with the rapid development of the digital media technology, the hardware performance is improved in multiples, the network bandwidth is greatly increased, the network speed is increased, and the number of mobile devices is geometrically increased, thereby providing a development opportunity for video applications. Video applications are developing rapidly from single viewpoint, low resolution and low code rate to multiple viewpoints, high resolution and high code rate, so as to provide a user with a brand new type of video content and brand new video display characteristics, and to provide a better sense of presence and viewing experience.

A 360-degree panoramic video (hereinafter referred to as panoramic video), as a brand new type of video content, allows a user to choose to view at any viewing angle according to subjective needs, thereby achieving 360-degree omnidirectional viewing. Although the network performance and hardware processing performance are high at present, the great increase of the number of users and the huge number of panoramic video data require the reduction of the occupation of network and hardware resources while ensuring the viewing experience of the users.

Currently, a region of interest (hereinafter referred to as ROI) technology can crop a panoramic video for display according to a user preference, without processing all panoramic videos. However, in the related art, there is generally only one ROI, only partial images in a panoramic video can be displayed limitedly, and the requirement of a user for watching a plurality of ROIs cannot be satisfied. Therefore, how to realize coding when there are a plurality of ROIs, so as to indicate the composite display of the various ROIs is urgent to be solved.

SUMMARY

The embodiments of the present disclosure provide an image processing method, apparatus and system, a network device, a terminal and a storage medium, which can solve the problem concerning how to realize coding when there are a plurality of ROIs.

Some embodiments of the present disclosure provide an image processing method, including:
acquiring composition indication information for indicating a composition and display manner of ROIs in a video image; and
generating a media stream of the video image based on at least the composition indication information.

Some embodiments of the present disclosure provide an image processing method, including:
receiving a video stream and description data of a video image;
parsing the description data to obtain composition indication information of ROIs; and
controlling, according to the composition indication information, composition, playback and display of images of the ROIs in the video stream.

Some embodiments of the present disclosure provide an image processing method, including:
at a network side, acquiring composition indication information for indicating a composition and display manner of ROIs in a video image, generating a media stream of the video image based on at least the composition indication information, and sending the media stream to a target node; and
receiving, by the target node, the media stream, parsing, by the target node, the media stream to obtain the composition indication information of the ROIs, and controlling, by the target node according to the composition indication information, playback and display of the video stream in the media stream.

Some embodiments of the present disclosure provide an image processing apparatus, including:
an acquisition module, configured to acquire composition indication information for indicating a composition and display manner of ROIs in a video image; and
a processing module, configured to generate a media stream of the video image based on at least the composition indication information.

Some embodiments of the present disclosure provide an image processing apparatus, including:
a receiving module, configured to receive a video stream and description data of a video image;
a parsing module, configured to parse the description data to obtain composition indication information of ROIs; and
a control module, configured to control, according to the composition indication information, composition, playback and display of images of the ROIs in the video stream.

Some embodiments of the present disclosure provide an image processing system, including the foregoing two image processing apparatuses.

Some embodiments of the present disclosure provide a network device, including a first processor, a first memory, and a first communication bus, wherein
the first communication bus is configured to implement connection and communication between the first processor and the first memory, and
the first processor is configured to execute one or more computer programs in the first memory, so as to implement the operations of the image processing method above.

Some embodiments of the present disclosure provide a terminal, including a second processor, a second memory, and a second communication bus;

the second communication bus is configured to implement connection and communication between the second processor and the second memory, and the second processor is configured to execute one or more computer programs stored in the second memory, so as to implement the operations of the image processing method above.

Some embodiments of the present disclosure provide a storage medium, wherein the storage medium stores one or more programs, and the one or more programs can be executed by one or more processors, so as to implement the operations of the image processing method above.

The other features of the embodiments of the present disclosure and the corresponding beneficial effects will be presented in the following descriptions. At least some of the beneficial effects will become obvious from the description of the embodiments of the present disclosure.

DETAILED DESCRIPTION OF THE EMBODIMENTS

To make the object, technical solution and advantages of the present disclosure clearer, the embodiments of the present disclosure are further described in details below with reference to embodiments and the accompanying drawings. It should be understood that the embodiments described herein are only intended to explain the present disclosure, but not to limit the present disclosure.

Embodiment I

Figure 1:
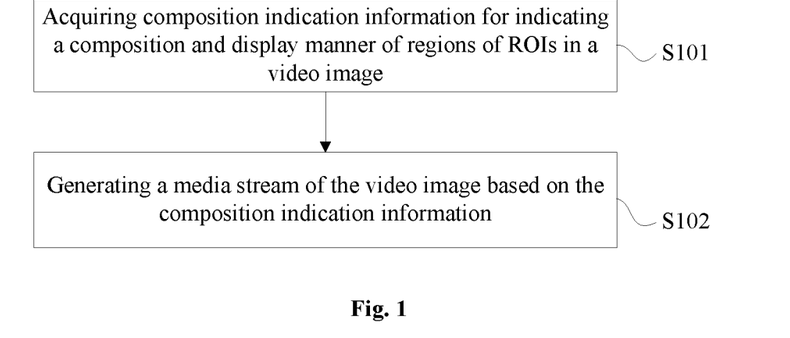
FIG. 1 is a schematic flow of an image processing method according to embodiment I of the present disclosure.

In order to realize coding when there are a plurality of ROIs in a video image, so as to satisfy the requirement of a user for viewing a plurality of ROIs at the same time, some embodiments of the present disclosure provide an image processing method. The image processing method is mainly applied to a network side device, an encoder, etc., including, but is not limited to, a server, a base station, etc. Referring to FIG. 1, the image processing method includes the following operations S101 and S102.

In S101, composition indication information for indicating a composition and display manner of ROIs in a video image is acquired.

When a video image is encoded, composition indication information for indicating a composition and display manner of ROIs in the video image is acquired. It should be understood that, when there is no video image or no ROI is divided, the process of acquiring the composition indication information does not exist. Only when there are a plurality of ROIs, the corresponding composition indication information is acquired. In cases where there is only one ROI, the present solution can also be used to control the display of the single ROI.

Optionally, in the coding process, when it is determined that there are ROIs in the video image, corresponding composition indication information for indicating a composition and display manner of the ROIs is acquired.

The ROIs may be set according to the following manners (it may be appreciated that the setting is not limited to be performed in the following manners).

1. A video image may be analyzed in advance by technologies such as image processing and ROI recognition. Specific content or a specific spatial position in the panoramic video may be divided based on an analysis result, so as to form different ROIs. For example, during a football match, a camera is used to separately track and paragraph the motion track of a football, and the region related to the motion track is taken as an ROI; or a specific object (for example, a certain player) in the photographed video image is identified and tracked by using an ROI identification technology, so as to form an ROI.
2. According to user requirements or preset information, a video image is manually divided into specific contents or specific spatial positions, so as to form different ROIs.
3. In the process of playback of a video image, information about ROIs of a user is collected, and specific contents or specific spatial positions in a panorama video are automatically divided according to the information, so as to form different ROIs.
4. The ROIs are selected by the user during the process of watching the video image.

In S102, a media stream of the video image is generated based on at least the composition indication information.

A media stream of the video image is generated based on at least the composition indication information. That is, the composition indication information is encoded and written into a code stream of the video image, so as to generate a media stream of the video image. For a playback device, the media stream may be decoded, and at least the ROIs in the video image may be composited, displayed and played back.

The composition indication information includes at least one of indication information as follows:
first indication information for indicating splicing and display of the ROIs, second indication information for indicating fusion and display of the ROIs, third indication information for indicating nesting and display of the ROIs, fourth indication information for indicating scaling and display of the ROIs, fifth indication information for indicating rotation and display of the ROIs, and sixth indication information for indicating cropping and display of the ROIs.

Figure 2:
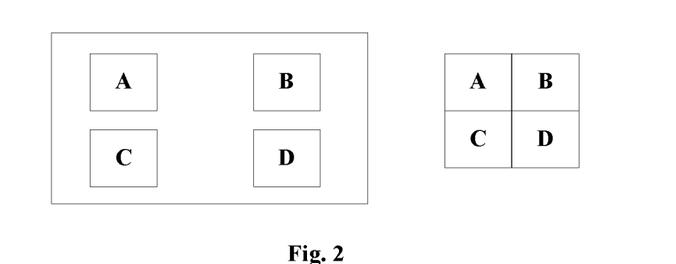
FIG. 2 is a schematic diagram I of an ROI image splicing indication according to embodiment I of the present disclosure.

The first indication information is used for indicating splicing of various ROIs, splicing referring to the arrangement of two ROIs in an adjacent but not overlapped manner. Referring to FIG. 2, regions A, B, C, and D are four ROIs in a video image, and the regions are consistent in size, and may be spliced together according to their positions in the panorama.

Figure 3:
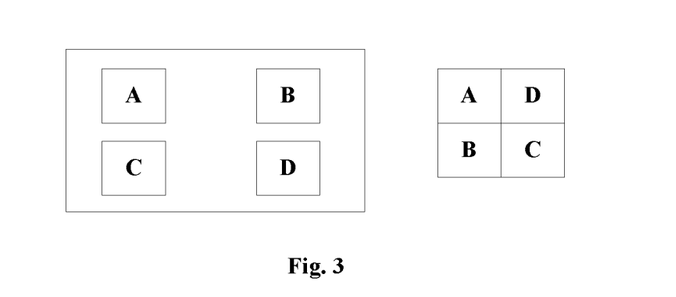
FIG. 3 is a schematic diagram II of an ROI image splicing indication according to embodiment I of the present disclosure.

Optionally, as shown in FIG. 3, regions A, B, C, and D may be spliced together according to arbitrary positions or a specified positions.

Figure 4:
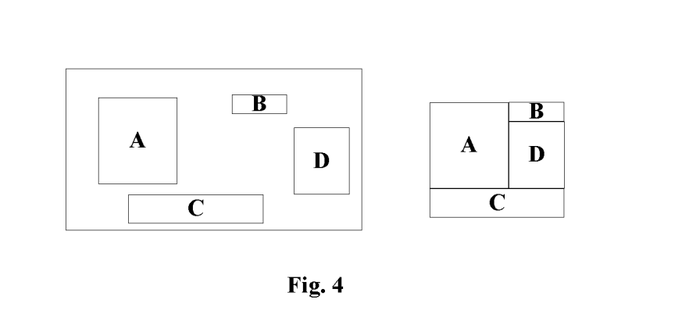
FIG. 4 is a schematic diagram III of an ROI image splicing indication according to embodiment I of the present disclosure.

Optionally, as shown in FIG. 4, the sizes of areas A, B, C, and D may be inconsistent.

Figure 5:
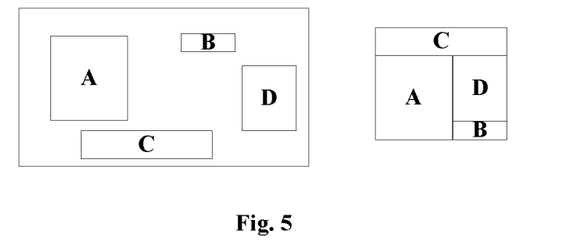
FIG. 5 is a schematic diagram IV of an ROI image splicing indication according to embodiment I of the present disclosure.

Optionally, as shown in FIG. 5, regions A, B, C, and D may be arranged at random, and the sizes of the regions A, B, C, and D may also be different.

Figure 6:
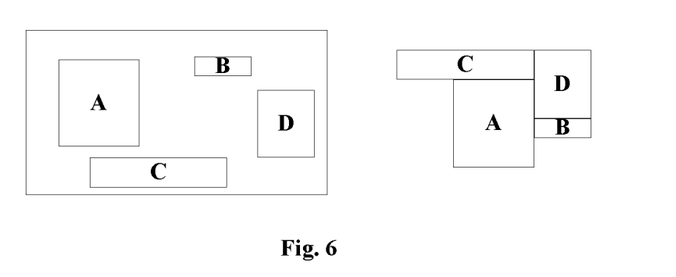
FIG. 6 is a schematic diagram V of an ROI image splicing indication according to embodiment I of the present disclosure.

Optionally, as shown in FIG. 6, the regions A, B, C, and D may be spliced to form any non-rectangular shape.

Figure 7:
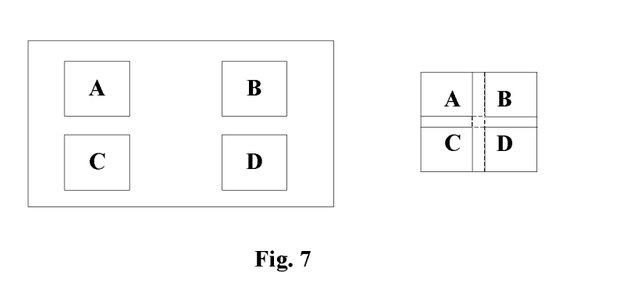
FIG. 7 is a schematic diagram I of an ROI image fusion indication according to embodiment I of the present disclosure.

The second indication information is used for indicating the fusion of the ROIs, the fusion causes a partial overlap region between two ROIs, but it does not means to completely overlap one of the ROIs onto the other ROI. Referring to FIG. 7, regions A, B, C, and D are four ROIs in the video image, and are fused together by overlapping regions of a specific range.

Figure 8:
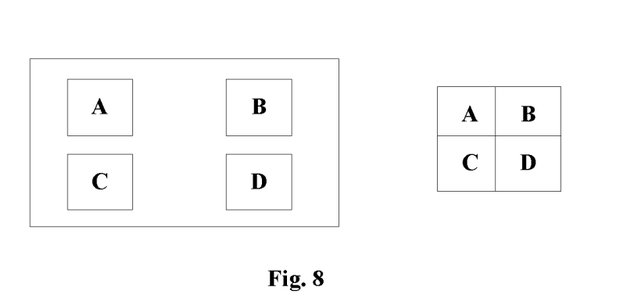
FIG. 8 is a schematic diagram II of an ROI image fusion indication according to embodiment I of the present disclosure.

Optionally, as shown in FIG. 8, the composition and display manner of the four ROIs may be directly covering pixels according to a fixed coverage sequence, and the coverage sequence is A→B→C→D in FIG. 8, and therefore, the finally covered D is not covered by the other three ROIs.

Figure 9:
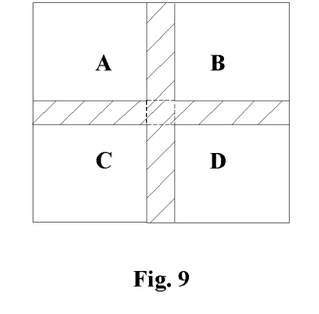
FIG. 9 is a schematic diagram of ROI image overlap regions according to embodiment I of the present disclosure.

Optionally, for the overlapped regions generated by fusion, the pixel values thereof can be processed in the following manner. As shown in FIG. 9, the pixels of the overlapped portions of different regions of four ROIs are calculated to generate new pixel values. For example, the values of all pixels are averaged, or different weights are set for pixels in different regions, or a new pixel value is obtained by calculation according to a feature matching method, so as to obtain a natural image fusion effect. Calculating a new pixel value according to a feature matching method is generally applied at a network side device having a relatively strong video processing capability, so as to obtain the best fusion effect as much as possible. The calculation of the new pixel value according to the feature matching method is also applicable to the terminal side theoretically, but has a relatively high requirement on the performance of the terminal.

Figure 10:
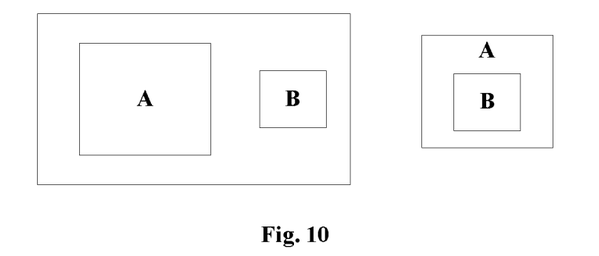
FIG. 10 is a schematic diagram of an ROI image nesting indication according to embodiment I of the present disclosure.

The third indication information is used for indicating the nested display of the ROIs, wherein nested display is to completely overlap one ROI over another ROI. Referring to FIG. 10, regions A and B are two ROIs in a video image, and are nested together by completely overlapping region B over region A. The nested position can be set according to actual requirements. For example, the nested position can be set according to the size of an image picture, and a small ROI in the image picture is overlapped on a large ROI in the image picture; or the nested position can be customized by a user.

The fourth indication information is used for indicating the scaling of the ROI, that is, the size of the image is changed. The fourth indication information may include a scaling value, for example, when the scaling value is 2, it may indicate that the diagonal length of the ROI is enlarged to 2 times of the original diagonal length.

The fifth indication information is used for indicating the rotation of the ROI. The fifth indication information may include a rotation type and a rotation angle, wherein the rotation type includes, but is not limited to, horizontal rotation and vertical rotation.

Figure 11:
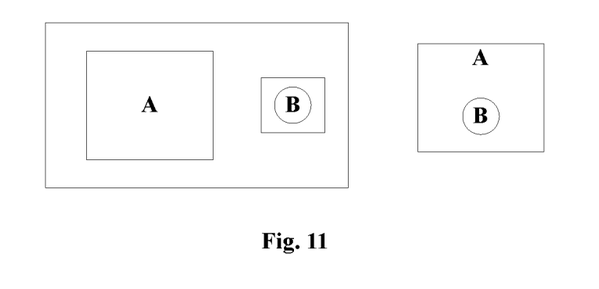
FIG. 11 is a schematic diagram of transparent channel processing of an ROI image according to embodiment I of the present disclosure.

The sixth indication information is used for indicating the cropping and display of ROIs. Referring to FIG. 11, regions A and B are two ROIs in a video image, and a circular region in region B is cropped, which can be realized by adopting an Alpha transparent channel. Optionally, the cropped B may also be nested with A to composite the image.

In an actual application, generally, a plurality of the foregoing six types of indication information may be combined to perform composition processing on corresponding ROIs, so as to better satisfy a user's demand of viewing a plurality of ROIs.

In some embodiments, the H.264/AVC standard and the H.265/High Efficiency Video Coding (HEVC) standard may be used to encode a video image. In the coding process, the acquired composition indication information is written into the code stream of the video image.

In other examples of the present disclosure, feature information of each corresponding ROI in the video image may also be acquired. Based on the acquired composition indication information and the feature information, a media stream of the video image is generated. That is, the composition indication information and the feature information are written into the code stream of the video image at the same time.

The generated media stream includes at least the following two parts: description data and a video stream. In some embodiments, the acquired composition indication information and feature information are written into the description data. It should be noted that the description data is mainly used to instruct to decode a video stream, so as to play back a video image. The description data may include at least one of the following information: for example, time synchronization information, text information, and other associated information.

It should also be noted that the description data is arranged as a part of the video image. Optionally, there are two forms of arrangement as follows: the description data may be encoded together with the video stream in the form of a code stream, that is, the description data serve as a part of data of the video stream; alternatively, the description data may be encoded independently from the video stream and separated from the video stream.

The feature information of the ROI includes position information and/or coding quality indication information. The position information includes coordinate information of specific positions of the ROI, and length and width values of the ROI. The specific position may be the position of any one of the four corners of the ROI, for example, the pixel point of the upper left corner, the pixel point of the lower right corner, or the position of the center point of the ROI. The coding quality indication information may be a coding quality grade used in a coding process, and different coding quality indication information represents different coding quality grades. After coding is performed by using different coding quality grades, the quality of the generated images is also different. For example, the coding quality indication information may be "1", "2", "3", "4", "5", or "6", and different values represent different coding quality grades. For example, when the coding quality indication information is "1", it indicates that low-quality coding is used; in comparison, when the coding quality indication information is "2", it indicates that medium-quality coding better than "1" is used; the coding quality is successively incremented with the increase of the numerical value.

Figure 12:
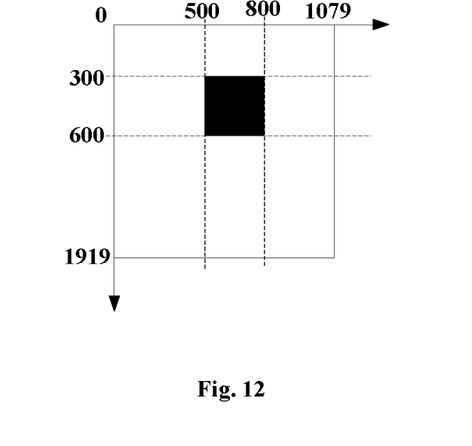
FIG. 12 is a schematic diagram of coordinate positions of an ROI image according to embodiment I of the present disclosure.

In other examples of the present disclosure, the position information of the ROI may also be represented in the following manner. Referring to FIG. 12, for the ROI 121, an upper side is located at the 300th row of the video image, a lower side is located at the 600th row of the video image, a left side is located at the 500th column of the video image, and a right side is located at the 800th column of the video image. That is, the position information is identified by the row and column positions of the ROI. For an image region of 1920*1080, the position of the pixel point at the upper left corner is (0,0), and the position of the pixel point at the lower right corner is (1919,1079). With regard to two-dimensional or three-dimensional image regions, a Cartesian coordinate system may be used, and other non-Cartesian curved coordinate systems, such as, a cylindrical, spherical or polar coordinate system may also be used.

It should be understood that, the length value of the ROI, as shown in FIG. 12, is the length of the upper side or the lower side, that is, the distance between the left side and the right side may be taken as the length value of the ROI, that is, 800−500=300 pixel points, and 600−300=300 pixels points may be taken as the width value of the ROI. Vice versa.

For the composition indication information and the feature information of each of the ROIs, reference is made to Table 1 below:

TABLE 1

| Syntax | Value | Number of bits | Type |
|---|---|---|---|
| roi_info_table( ) { | | | |
| table_id | | 8 | uimsbf |
| version | | 8 | uimsbf |
| length | | 32 | uimsbf |
| table_payload { | | | |
| roi_num | N | 8 | uimsbf |
| i = 0 | | | |
| while(i < N) { | | | |
| roi_position_x | | 32 | double |
| roi_position_y | | 32 | double |
| roi_position_z | | 32 | double |
| roi_width | | 32 | double |
| roi_height | | 32 | double |
| roi_quality | | 8 | uimsbf |
| relation_type | | 8 | uimsbf |
| roi_new_position_x | | 32 | double |
| roi_new_position_y | | 32 | double |
| roi_new_position_z | | 32 | double |
| scale | | 32 | double |
| rotation | | 32 | double |
| flip | | 8 | uimsbf |
| alpha_flag | | 8 | uimsbf |
| if(alpha_flag == 1) | | | |
| alpha_info( ) | | | |
| if(relation_type == 2) | | | |
| filter_info( ) | | | |
| user_data( ) | | | |
| ...... | | | |
| } | | | |

In the Above Table:
  table_id: table identifier;
  version: version information;
  length: length information;
  roi_num: the number of ROIs;
  (roi_position_x, roi_position_y, roi_position_z): coordinate information of an ROI in the video image;
  roi_width: the width of an ROI;
  roi_height: the height of an ROI;
  roi_quality: the quality information of an ROI;
  relation_type: composition indication information of an ROI, 0 being splicing, 1 being nesting, and 2 being fusion;
  (roi_new_position_x, roi_new_position_y, roi_new_position_z): coordinate information of an ROI in the new image;
  scale: the scaling ratio of an ROI;
  rotation: the rotation angle of an ROI;
  flip: flipping of an ROI, 0 being horizontal flipping, and 1 being vertical flipping;
  alpha_flag: transparent channel identifier, 0 indicating that there is no transparent channel information, and 1 indicating that there is transparent channel information;
  alpha_info( ): transparent channel information, combined with an ROI (cropped) to create a new image;
  filter_info( ): when the relation_type is a fusion mode, a filtering mode of the fusion region can be indicated, such as a mean value or a median value;
  user_data( ): user information.

The roi_info_table containing the described composition indication information and feature information of the ROIs is written into description data of a video image. Optionally, the description data includes at least one of: supplemental enhancement information (SEI), video usability information (VUI) and a system layer media attribute description unit.

The roi_info_table is written into the supplemental enhancement information in a video code stream. A specific example may be a structure shown in table 2 as follows.

TABLE 2

| | Descriptor |
|---|---|
| sei_payload(payloadType, payloadSize) } | |
| ...... | |
|   if(payloadType == ROI_INFO) } | |
|   ...... | |
|     roi_info_table(payloadSize); | |
|   ...... | |
|   } | |
| } | |

The roi_info_table contains relevant information (composition indication information, feature information, etc.) of corresponding ROIs, and the relevant information can be written into the SEI. Information with identifier information being ROI_INFO can be acquired from SEI information, that is, the information of ROI_INFO is taken as the identifier information of SEI information.

The roi_info_table is written into the VUI. For a specific example, reference may be made to the structure shown in table 3 below.

TABLE 3

| | Descriptor |
|---|---|
| vui_parameters( ) { | |
|   ...... | |
|   roi_info_flag | u(1) |
|   if(roi_info_flag) { | |
|     ...... | |
|     roi_info_table( ); | |
|     ...... | |
|   } | |
| } | |

When the value of the roi_info_flag in table 3 is equal to 1, it indicates that there is ROI information in the following content. The roi_info_table( ) is the data structure of the roi_info_table in table 1, and contains relevant information of the ROIs. The relevant information of the ROI can be acquired from the VUI information when the identifier information of roi_info_flag is 1.

The roi_info_table is written into a system layer media attribute description unit. The system layer media attribute description unit includes, but is not limited to, a descriptor of a transport stream, a data unit of a file format (for example, in Box), and media description information of the transport stream (for example, information elements such as a media presentation description (MPD)).

The composition indication information and the feature information of the ROIs are written into the SEI, and a temporal motion-constrained tile set (MCTS) thereof may further be combined. Optionally, relevant information of the ROIs may be combined with the MCTS based on the H.265/HEVC standard. The composition indication information of the ROIs is tightly combined with the tile, and the required tile data can be flexibly extracted without addition of separate coding and decoding of ROI data. In this way, different requirements of a user can be satisfied, and interaction with the user in an application is facilitated. The combination of the relevant information of the ROIs with the MCTS is as shown in table 4 below.

TABLE 4

| | Descriptor |
|---|---|
| temporal_motion_constrained_tile_sets(payloadSize) { | |
|   mc_all_tiles_exact_sample_value_match_flag | u(1) |
|   each_tile_one_tile_set_flag | u(1) |
|   if(!each_tile_one_tile_set_flag) { | |
|     limited_tile_set_display_flag | u(1) |
|     num_sets_in_message_minus1 | u(1) |
|     for( i = 0; i <= num_sets_in_message_minus1; i++) { | |
|       mcts_id[i] | ue(v) |
|       ...... | |
|       num_tile_reds_in_set_minus1[i] | ue(v) |
|       for( j = 0; j <= num_tile_rects_in_set_minus1 [i]; j++) { | |
|         top_left_tile_index[i][j] | ue(v) |
|         bottom_right_tile_index[i][j] | ue(v) |
|         roi_info_flag | u(1) |
|         if(roi_info_flag == 1) | |
|           roi_info( ) | |
|       } | |
|     ...... | |
|   } else { | |
|     max_mcs_tier_level_idc_present_flag | u(1) |
|     if(mcts_max_tier_level_idc_present_flag) } | |
|       mcts_max_tier_flag | u(1) |
|       mcts_max_level_idc | u(8) |
|     } | |
|     roi_info_flag | u(1) |
|     if(roi_info_flag == 1) | |
|       roi_info( ) | |
|   } | |
| } | |

In the above table, the value of roi_info_flag being 0 represents the absence of the relevant information of the ROIs, and the value of roi_info_flag being 1 represents the presence of the relevant information of the ROIs, One example of the roi_info is shown in table 5 below.

TABLE 5

| | Descriptor |
|---|---|
| roi_info( ) { | |
|   length | ue(v) |
|   roi_num | ue(v) |
|   i = 0 | |
|   while( i < N ) { | |
|     roi_pos_x | ue(v) |
|     roi_pos_y | ue(v) |
|     roi_width | ue(v) |
|     roi_height | ue(v) |
|     roi_quality | u(8) |
|     relation_type | u(8) |
|     roi_new_pos_x | ue(v) |
|     roi_new_pos_y | ue(v) |
|     scale | ue(v) |
|     rotation | ue(v) |
|     flip | u(8) |
|     alpha_flag | u(1) |
|     if(alpha_flag == 1) | |
|       alpha_info( ) | |
|     if(relation_type == 2) | |
|       filter_info( ) | |
|   } | |
| } | |

In the Above Table:
  length: length information;
  roi_num: the number of ROIs;
  (roi_pos_x, roi_pos_y): coordinate information of an ROI in a slice group or in a tile;
  roi_width: the width of an ROI;
  roi_height: the height of an ROI;
  roi_quality: the quality information of an ROI;
  relation_type: association relation of an ROI, 0 being splicing, 1 being nesting, and 2 being fusion;
  (roi_new_pos_x, roi_new_pos_y): coordinate information of an ROI in the new image;
  scale: the scaling of an ROI;
  rotation: the rotation angle of an ROI;
  flip: flipping of an ROI, 0 being horizontal flipping, and 1 being vertical flipping;
  alpha_flag: transparent channel identifier, 0 indicating that there is no transparent channel information, and 1 indicating that there is transparent channel information;
  alpha_info( ): transparent channel information, which may be combined with an ROI to create a new image;
  filter_info( ): when the relation_type is a fusion mode, a filtering mode of the fusion region can be indicated, such as a mean value or a median value.

A video stream included in the media stream contains video image data. The process of generating the video stream includes: acquiring the ROIs of the video image, dividing associated images of the ROIs in the same image frame into at least one slice unit, and performing independent coding on the at least one slice unit to generate a first video stream of the video image.

Figure 13:
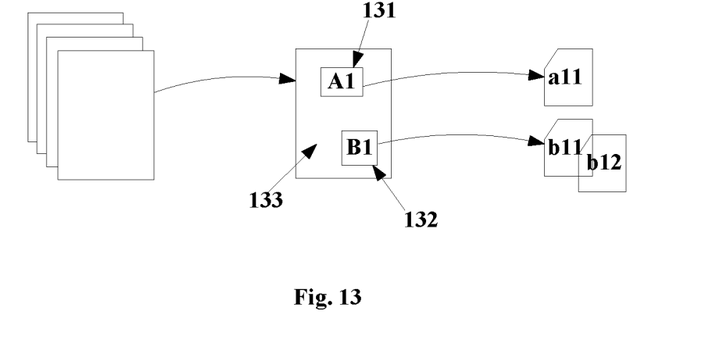
FIG. 13 is a schematic diagram I of generating a video stream of an ROI image according to embodiment I of the present disclosure.

Referring to FIG. 13, a first frame image of a video image is acquired, and an associated image of each ROI in the first frame image is determined. Herein, it is assumed that there are two ROIs in the video image, ROI 131 and ROI 132, and the associated image A1 of the ROI 131 and an associated image B1 of the ROI 132 exist in the first frame image. In this case, the associated image A1 of the ROI 131 is divided into at least one slice unit and is independently coded, and the associated image B1 of the ROI 132 is divided into at least one slice unit and is independently coded; or both the associated image A1 and the associated image B1 are collectively divided into at least one slice unit and are independently coded. The operations similar to those performed on the first frame image are performed on all other frames of the video image in a serial or parallel manner, until the coding of all the video frames of the video image is completed, so as to generate the first video stream.

For example, the associated image A1 is divided into one slice unit a11 and is independently coded, and the associated image B1 is divided into two fragment units b11 and b12 and is independently coded.

For the region 133 other than the associated images of the ROIs in the video image, any existing coding manner may be used for coding, which may be independent coding or non-independent coding. The first video stream finally generated at least includes all independently coded slice units of the various ROIs. For the receiving end, when the user only needs to view the ROI image, the receiving end may extract only the slice units corresponding to the ROIs in the first video stream (without the need to extract all the slice units), and independently decode the slice units, so that decoding can be completed without depending on other slices, thereby reducing the requirement for the decoding performance of the receiving end.

If necessary, only the associated images of the ROIs in the video image may be encoded, and other regions except the associated images are not encoded, or the associated images and other regions are encoded separately.

The slicing unit includes slices of the H.264/AVC standard, tiles of the H.265/HEVC standard, and the like.

A video stream in a media stream may alternatively be a second video stream. The process of generating the second video stream is as follows: compositing various associated images according to the composition indication information to form an image frame to be processed, dividing the image frame to be processed into at least one slice unit, and coding the at least one slice unit to generate a second video stream of the ROIs.

Figure 14:
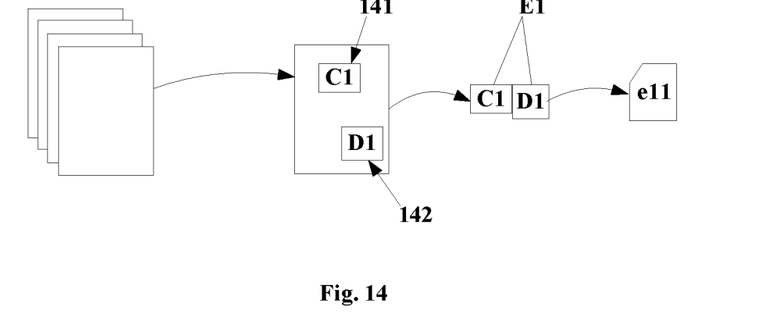
FIG. 14 is a schematic diagram II of generating a video stream of an ROI image according to embodiment I of the present disclosure.

Referring to FIG. 14, unlike the first video stream, the second video stream is generated in the following manner. Associated images (C1 and D1 respectively) of ROIs (ROI 141 and ROI 142 included in FIG. 14) in the same image frame of the video image are composited according to the composition indication information (it is assumed here that the associated images are composited in a splicing manner), the composite image is taken as an image frame E1 to be processed, then the image frame E1 to be processed is divided into at least one slice unit (for example, e11), and then the at least one slice unit (for example, e11) is coded (the coding manner may be independent coding, non-independent coding, or other coding manners). Other image frames in the video image may also be processed by the method above, and the image frames may be processed in parallel or in serial. In the above manner, the second video stream is generated.

For a decoding end, the second video stream may be processed by using a common decoding method, a composite ROI image may be directly obtained after decoding, and it is unnecessary to perform combination processing on the associated images of the ROIs. This coding method is beneficial to reducing a processing load of the decoding end, and improving decoding efficiency. As a premise, the composition processing needs to be performed first during the encoding.

In other examples of the present disclosure, the network side or the coder may generate the two video streams above for the same video image.

The generated media stream may be stored or sent to a corresponding target node. For example, when a request for acquiring a video image is received from a target node, the media stream is triggered to be sent to the target node. Optionally, the identifier information of the acquired content indicated by the acquisition request is parsed, and the media stream is sent to the target node according to the identifier information.

Optionally, when the identifier information is a first identifier, the first video stream and the description data are sent to the target node. For example, a server end receives a request of a terminal for a video image, and sends a media stream (including a first video stream and description data) of the video image to the terminal in responsive to the request. The terminal may decode the media stream to play back the video image completely. Of course, the terminal may also decode the media stream, extract the data of the at least one independently encoded slice unit in which the ROIs are located, and play back and display the images of the ROIs with the help of the description data.

When the identifier information is a second identifier, the slice unit of the ROIs in the first video stream and the description data are extracted (without performing a decoding operation), and are sent to the target node. For example, a server end may receive an ROI request from a terminal, the server end finds, in responsive to the request information, data of at least one independently encoded slice unit where the corresponding ROIs are located, extracts relevant information (composition indication information, feature information, and the like) of the ROIs or modified ROI information, generates a new code stream, and sends the new code stream to the terminal. In this way, the sending of the complete code stream to the terminal is avoided, thereby reducing network bandwidth occupation and transmission delay.

When the identifier information is a third identifier, the second video stream and the description data are sent to the target node. For example, the server may also send a second video stream of the video image and description data to the terminal in responsive to a request sent by the terminal, and the terminal may decode the received second video stream and description data and then directly obtain a composite ROI image, without the need of compositing the ROIs according to composition indication information in the description data, which is beneficial to reducing terminal resource occupation and improving terminal processing efficiency.

In other examples of the present disclosure, the video image may be a 360-degree panoramic video, a stereoscopic video, etc. When the video image is a stereoscopic video, the relevant information of the ROIs (including composition indication information and feature information, etc.) may be applicable to left and right visual fields simultaneously.

According to the image processing method provided in the embodiments of the present disclosure, composition indication information is written into a code stream of the video image, and the composition indication information is used for indicating composition and display of images of ROIs in a video image. By virtue of the scheme, a coding process of a plurality of ROIs existing in the video image is realized, and a viewing demand of a user for viewing a plurality of ROIs at the same time is satisfied.

By independently coding the images of the ROIs, the decoding end can perform decoding independently without depending on other slices. When sending the media stream, data of at least one slice unit, where the ROIs are located, that can be independently decoded can be extracted and sent to the terminal, rather than sending all the slice data to the terminal, thereby being beneficial to reducing network bandwidth occupation and improving transmission efficiency and decoding efficiency.

Embodiment II

Figure 15:
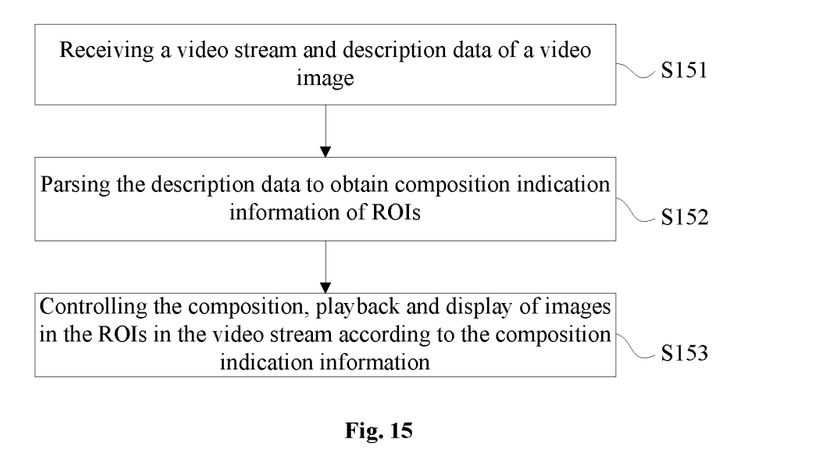
FIG. 15 is a schematic flow of an image processing method according to embodiment II of the present disclosure.

Based on embodiment I, some embodiments of the present disclosure provide an image processing method. The image processing method is mainly applied to a terminal, a decoder, etc., and includes, but is not limited to, a mobile phone, a personal computer, and the like. Referring to FIG. 15, the image processing method includes operations S151 to S153.

In S151, a video stream and description data of a video image are received.

In S152, the description data is parsed to obtain composition indication information of ROIs.

The composition indication information of the ROI information is extracted according to different types of description data, i.e. different positions where the relevant information of the ROIs is placed, such as SEI, VUI and MPD. For description of the composition indication information, reference may be made to embodiment I, and details are not repeatedly described herein. Optionally, feature information of each of the ROIs may also be acquired from the description data, and may include position information, coding quality indication information, etc.

ROI image data, i.e. video stream data, may be acquired according to the above relevant information of the ROIs.

In S153, composition, playback and display of images of the ROIs in the video stream are controlled according to the composition indication information.

The images of the ROIs are composited according to the composition indication information, and then played back and displayed.

In other examples of the present disclosure, before receiving the video stream of the video image and the description data, the method further includes an operation of sending an acquisition request to a network side (or a coding end). The acquisition request may further be provided with identifier information that is used to indicate the content requested to be acquired, so as to acquire different video streams.

For example, the identifier information may be set as a first identifier which instructs to acquire a first video stream and description data of the corresponding video image. The identifier information may also be set as a second identifier which instructs to acquire at least one slice unit of ROIs in the first video stream of the corresponding video image and the description data of the corresponding video image. The identifier information may also be set as a third identifier which instructs to acquire a second video stream and description data of the corresponding video image.

When the acquisition requests are different, the media streams received from the network side are different, and the subsequent processes are also accordingly different. For example, when the identifier information in the acquisition request is the first identifier, the first video stream and description data of a corresponding video image are acquired. In this case, the first video stream and the description data may be decoded to obtain a complete image of the video image, and the complete image may also be played back. Optionally, data of at least one independently decodable slice unit of the images of the ROIs is extracted from the first video stream, and the images of the ROIs are composited according to the composition indication information of the ROIs in the description data, and then played back and displayed.

When the identifier information in the acquisition request is the second identifier, the at least one independently decodable slice unit, where the ROIs of the corresponding video image are located, and the description data are acquired. In this case, the terminal may directly perform a decoding operation on the at least one independently decodable slice unit of the ROIs, composite the images of the ROIs according to the composition indication information in the description data, and then play back and display the composite image.

When the identifier information in the acquisition request is the third identifier, the second video stream and description data of the corresponding video image are acquired. In this case, the terminal may directly use a conventional decoding method to decode the second video stream, so as to obtain a composite ROI image, and then play back and display the composite ROI image.

It should be understood that the acquisition request is not limited to contain the identifier information for instructing to acquire the content, and may further include other necessary information, for example, address information of the local end and the peer end, identifier information of the video image that is requested to be acquired, and authentication information.

Embodiment III

Figure 16:
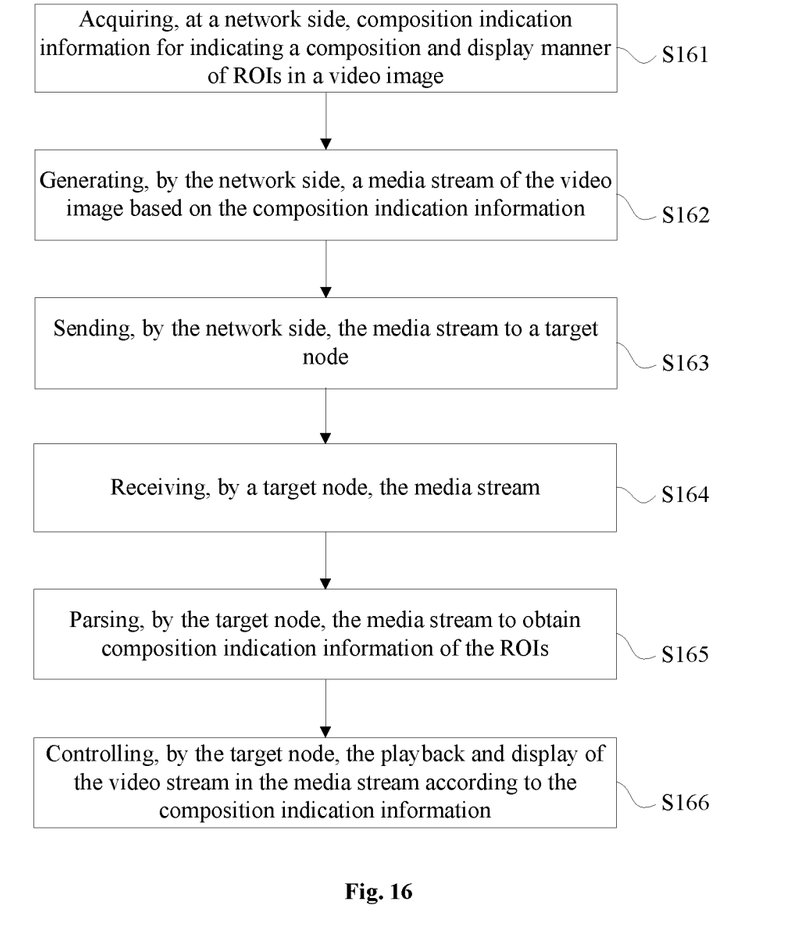
FIG. 16 is a schematic flow of an image processing method according to embodiment III of the present disclosure.

Based on embodiment I and/or embodiment II, some embodiments of the present disclosure provide an image processing method, which is mainly applied to a system including a network side and a terminal side. Referring to FIG. 16, the image processing method mainly includes operations S161 to S166.

In S161, a network side acquires composition indication information for indicating a composition and display manner of ROIs in a video image.

In S162, the network side generates a media stream of the video image based on at least the composition indication information.

In S163, the network side sends the media stream to a target node.

In S164, the target node receives the media stream.

In S165, the target node parses the media stream to obtain composition indication information of the ROIs.

In S166, the target node controls the playback and display of the video stream in the media stream according to the composition indication information.

The details thereof may refer to the related description of embodiment I and/or embodiment II, and will not be redundantly described herein.

It should be understood that the media stream generated by the network side may be the same as or different from the media stream sent to the target node by the network side. As stated in embodiment I and/or embodiment II, the network side may flexibly select, according to an acquisition request of the target node, a video stream to be sent to the target node, rather than a specific video stream. Therefore, the media stream generated by the network side may be used as a first media stream, and a media stream sent to the target node may be used as a second media stream, so as to make a distinguish therebetween.

Embodiment IV

Figure 17:
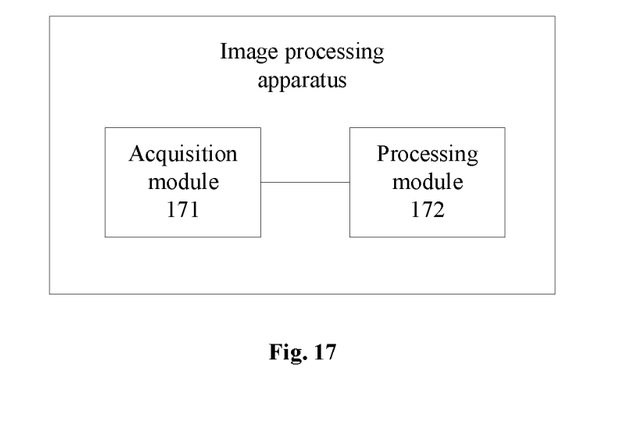
FIG. 17 is a schematic structural diagram of an image processing apparatus according to embodiment IV of the present disclosure.

Based on embodiment I, some embodiments of the present disclosure provide an image processing apparatus, which is configured to implement the operations of the image processing method according to embodiment I. Referring to FIG. 17, the image processing apparatus includes:

an acquisition module 171, configured to acquire composition indication information for indicating a composition and display manner of ROIs in a video image; and a processing module 172, configured to generate a media stream of the video image based on at least the composition indication information. For specific operations of the image processing method, reference may be made to the description in embodiment I, and it will not be redundantly described herein.

Embodiment V

Figure 18:
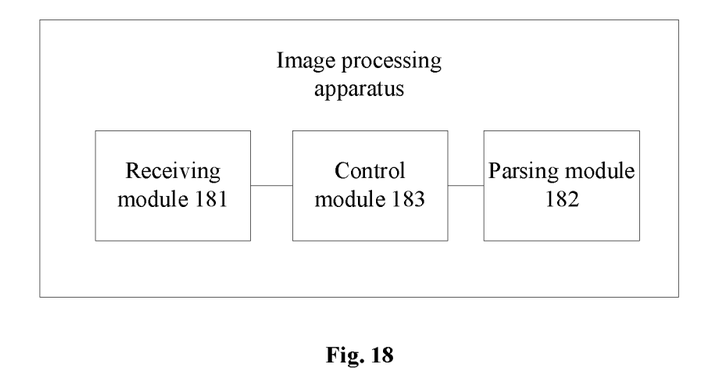
FIG. 18 is a schematic structural diagram of an image processing apparatus according to embodiment V of the present disclosure.

Based on embodiment II, some embodiments of the present disclosure provide an image processing apparatus, which is configured to implement the operations of the image processing method according to embodiment II. Referring to FIG. 18, the image processing apparatus includes:

a receiving module 181, configured to receive a video stream and description data of a video image;

a parsing module 182, configured to parse the description data to obtain composition indication information of ROIs; and a control module 183, configured to control, according to the composition indication information, composition, playback and display of images of the ROIs in the video stream.

For specific operations of the image processing method, reference may be made to the description in embodiment II, and it will not be redundantly described herein.

Embodiment VI

Figure 19:
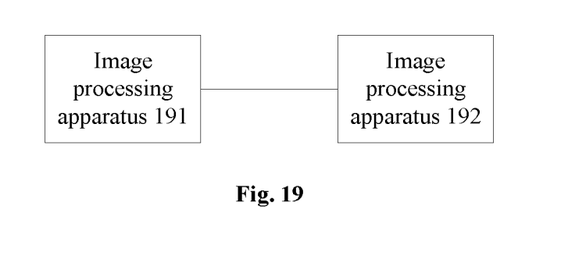
FIG. 19 is a schematic structural diagram of an image processing system according to embodiment VI of the present disclosure.

Based on embodiment III, some embodiments of the present disclosure provide an image processing system, including the image processing apparatus 191 according to embodiment IV and the image processing apparatus 192 according to embodiment V, as shown in FIG. 19. The image processing system is configured to implement the image processing method according to embodiment III.

For specific operations of the image processing method, reference made to the description in embodiment III, and it will not be redundantly described herein.

Embodiment VII

Figure 20:
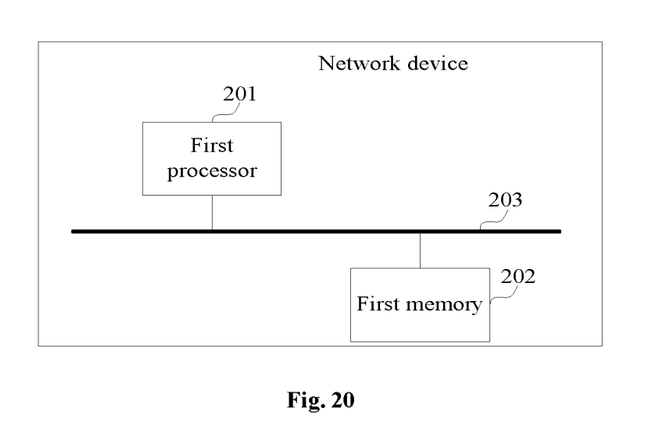
FIG. 20 is a schematic structural diagram of a network device according to embodiment VII of the present disclosure.

Based on embodiment I, some embodiments of the present disclosure provide a network device. Referring to FIG. 20, the network device includes a first processor 201, a first memory 202, and a first communication bus 203.

The first communication bus 203 is configured to implement connection and communication between the first processor 201 and the first memory 202.

The second processor 201 is configured to execute one or more computer programs stored in the second memory 202, so as to implement the operations of the image processing method according to embodiment I. Reference may be made to the description of embodiment I for details, and it will not be redundantly described herein.

Embodiment VIII

Figure 21:
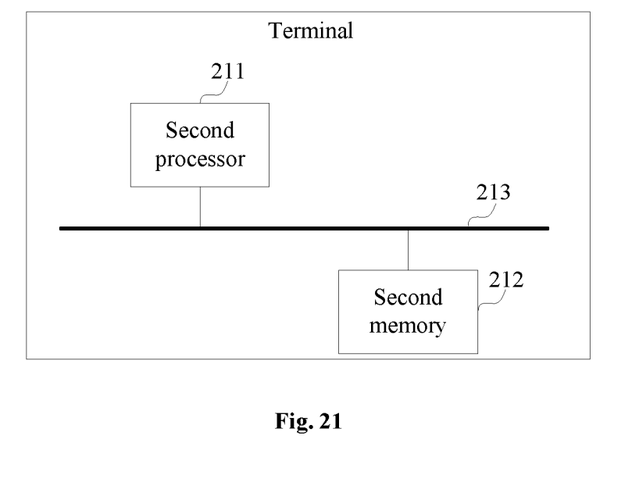
FIG. 21 is a schematic structural diagram of a terminal according to embodiment VIII of the present disclosure.

Based on embodiment II, some embodiments of the present disclosure provide a terminal. Referring to FIG. 21, the terminal includes a second processor 211, a second memory 212 and a second communication bus 213.

The second communication bus 213 is configured to implement connection and communication between the second processor 211 and the second memory 212.

The second processor 211 is configured to execute one or more computer programs stored in the second memory 212, so as to implement the operations of the image processing method according to embodiment II. Reference may be made to the description of embodiment II for details, and it will not be redundantly described herein.

Embodiment IX

Based on embodiment I and embodiment II, some embodiments of the present disclosure provide a storage medium. The storage medium may be a computer readable storage medium. The storage medium stores one or more computer programs, and the one or more computer programs may be executed by one or more processors, so as to implement the operations of the image processing method according to embodiment I or embodiment II.

Reference may be made to the description of embodiment I and embodiment II for details, which will not be redundantly described herein.

The storage medium includes volatile and nonvolatile, removable and non-removable media implemented in any method or technology for storage of information such as computer-readable instructions, data structures, program modules or other data. The storage medium includes, but is not limited to, random access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette, magnetic tape, magnetic disk storage or other magnetic storage devices, or any other medium that can be used to store desired information and that can be accessed by a computer.

The embodiments provide a computer program (or referred to as computer software). The computer program may be distributed on a computer readable medium and executed by a computing apparatus, so as to implement at least one operation of the image processing method according to embodiment I and/or embodiment II. Furthermore, in some cases, at least one operation shown or described may be executed in a sequence different from that described in the foregoing embodiments.

The embodiments provide a computer program product, including a computer readable device, and the computer readable device stores the computer program described as above. The computer readable device in the embodiments may include the computer program described as above.

Technical Effects of the Embodiments of the Present Disclosure are Described as Follows.

Provided in the embodiments of the present disclosure are an image processing method, apparatus and system, a network device, a terminal and a storage medium. The method includes: acquiring composition indication information for indicating a composition and display manner of ROIs in a video image; and generating a media stream of the video image based on at least the composition indication information, i.e., writing the composition indication information into a code stream of the video image, so as to implement the coding process of the video image when there are a plurality of (at least two) ROIs. During playback of the video, the composition, playback and display of various ROIs can be controlled based on the composition indication information, so that requirements of a user for viewing a plurality of ROIs at the same time can be satisfied. The technical effects that can be realized in some implementations may include, but are not limited to, the described technical effects.

Hence, those having ordinary skill in the art should understand that the functional modules/units in all or some of the operations, systems and apparatuses in the methods disclosed above may be implemented as software (which may be implemented by using executable program codes of the computing devices), firmware, hardware and appropriate combinations thereof. In a hardware implementation, the division between functional modules/units described in the above description does not necessarily correspond to the division of physical components. For example, a physical component may have multiple functions, or one function or operation may be cooperatively performed by several physical components. Some or all of the physical components may be implemented as software executed by a processor, such as a central processor, a digital signal processor, or a microprocessor, or may be implemented as hardware or an integrated circuit, such as an application specific integrated circuit.

In addition, those having ordinary skill in the art should know that a communication medium generally contains computer readable instructions, data structures, computer program modules, or other data in a modulated data signal such as a carrier wave or other transport mechanisms, and may include any information delivery media. Hence, the present disclosure is not limited to any particular combination of hardware and software.

The above is only the detailed description of the embodiments of the present disclosure made in conjunction with specific embodiments, and should not be considered as limitations on the specific implementations of the present disclosure. For those having ordinary skill in the art of the present disclosure, various simple deduction or alternation can also be made without departing from the conception of the present disclosure, and these deduction or alternation should be considered to fall within the scope defined by the appended sets of claims of the present disclosure.

What is claimed is:

1. An image processing method performed by a device, comprising:
    acquiring composition indication information for indicating a composition and display manner of regions of interest (ROIs) in a video image; and
    generating a media stream of the video image based on at least the composition indication information and feature information of each ROI in the ROIs, comprises:
    writing the composition indication information and the feature information of the each ROI into description data to generate the media stream, wherein the media stream comprises the description data;
    acquiring the ROIs of the video image, dividing associated images of the ROIs in a same image frame into at least one slice unit, and performing independent coding on the at least one slice unit to generate a first video stream of the video image;
    acquiring the ROIs of the video image, compositing associated images of the ROIs in a same image frame according to the composition indication information to form an image frame to be processed, dividing the image frame to be processed into the at least one slice unit, and coding the at least one slice unit to generate a second video stream of the ROIs, wherein the media stream comprises the first video stream, the at least one slice unit of the ROIs in the first video stream, or the second video stream;
    wherein the composition indication information comprises at least one of the following: first indication information for indicating splicing and display of the ROIs, second indication information for indicating fusion and display of the ROIs, third indication information for indicating nesting and display of the ROIs, fourth indication information for indicating scaling and display of the ROIs, fifth indication information for indicating rotation and display of the ROIs.

2. The image processing method according to claim 1, wherein the feature information of the each ROI comprises position information and/or coding quality indication information of the ROI, the position information of the ROI comprises coordinate information of one or more specific positions of the ROI, and length and width values of the ROI.

3. The image processing method according to claim 1, wherein the description data comprises at least one of the following: supplemental enhancement information, video usability information, and a system layer media attribute description unit.

4. The image processing method according to claim 1, further comprising: storing the media stream or sending the media stream to a target node.

5. The image processing method according to claim 4, before sending the media stream to the target node, further comprising: receiving an acquisition request of the target node for the video image.

6. The image processing method according to claim 5, wherein sending the media stream to the target node comprises: parsing identifier information of an acquired content indicated by the acquisition request, and sending the media stream to the target node according to the identifier information.

7. The image processing method according to claim 6, wherein sending the media stream to the target node according to the identifier information comprises at least one of the followings:
when the identifier information is a first identifier, sending the first video stream and the description data to the target node;
when the identifier information is a second identifier, extracting the at least one slice unit of the ROIs in the first video stream and the description data, and sending the at least one slice unit and the description data to the target node; and
when the identifier information is a third identifier, sending the second video stream and the description data to the target node.

8. The image processing method according to claim 1, wherein the composition indication information further comprises: sixth indication information for indicating cropping and display of the ROIs.

9. The image processing method according to claim 1, wherein the video image is a panoramic video image.

10. A network device, comprising a first processor, a first memory, and a first communication bus, wherein
the first communication bus is configured to implement connection and communication between the first processor and the first memory, and
the first processor is configured to execute one or more computer programs stored in the first memory, so as to implement the operations of the image processing method according to claim 1.

11. A storage medium, wherein the storage medium stores one or more computer programs, and the one or more computer programs can be executed by one or more processors, so as to implement the operations of the image processing method according to claim 1.

12. An image processing method performed by a device, comprising:
receiving a video stream and description data of a video image, wherein the descriptor data includes composition indication information for indicating a composition and display manner of regions of interest (ROIs) in the video image and feature information of each ROI in the ROIs, the video stream includes a first video stream, at least one slice unit of the ROIs in a first video stream, or a second video stream, wherein the first video stream is a generated by dividing associated images of the ROIs in a same image frame into the at least one slice unit, and performing independent coding on the at least one slice unit, the second video stream is a generated by compositing associated images of the ROIs in a same image frame according to the composition indication information to form an image frame to be processed, dividing the image frame to be processed into the at least one slice unit, and coding the at least one slice unit;
parsing the description data to obtain the composition indication information and the feature information of the each ROI; and
controlling, according to the composition indication information and the feature information of the each ROI, composition, playback and display of images of the ROIs in the video stream;
wherein the composition indication information comprises at least one of the following: first indication information for indicating splicing and display of the ROIs, second indication information for indicating fusion and display of the ROIs, third indication information for indicating nesting and display of the ROIs, fourth indication information for indicating scaling and display of the ROIs, fifth indication information for indicating rotation and display of the ROIs.

13. A terminal, comprising: a second processor, a second memory, and a second communication bus, wherein
the second communication bus is configured to implement connection and communication between the second processor and the second memory, and
the second processor is configured to execute one or more computer programs stored in the second memory, so as to implement the operations of the image processing method according to claim 12.

14. A storage medium, wherein the storage medium stores one or more computer programs, and the one or more computer programs can be executed by one or more processors, so as to implement the operations of the image processing method according to claim 12.

15. An image processing method, comprising:
at a network side, acquiring composition indication information for indicating a composition and display manner of regions of interest (ROIs) in a video image, generating a media stream of the video image based on at least the composition indication information and feature information of each ROI in the ROIs, comprises: writing the composition indication information and the feature information of the each ROI into description data to generate the media stream, wherein the media stream comprises the description data; acquiring the ROIs of the video image, dividing associated images of the ROIs in a same image frame into at least one slice unit, and performing independent coding on the at least one slice unit to generate a first video stream of the video image; acquiring the ROIs of the video image, compositing associated images of the ROIs in a same image frame according to the composition indication information to form an image frame to be processed, dividing the image frame to be processed into the at least one slice unit, and coding the at least one slice unit to generate a second video stream of the ROIs, wherein the media stream comprises the first video stream, the at least one slice unit of the ROIs in the first video stream, or the second video stream, and sending the media stream to a target node; and
receiving, by the target node, the media stream, parsing, by the target node, the media stream to obtain the composition indication information of the ROIs and the feature information of the each ROI, and controlling, by the target node according to the composition indication information and the feature information of the each ROI, playback and display of the video stream in the media stream;

wherein the composition indication information comprises at least one of the following: first indication information for indicating splicing and display of the ROIs, second indication information for indicating fusion and display of the ROIs, third indication information for indicating nesting and display of the ROIs, fourth indication information for indicating scaling and display of the ROIs, fifth indication information for indicating rotation and display of the ROIs.

16. An image processing system, comprising a network device and a terminal, wherein the network device comprises a first processor, a first memory, and a first communication bus, the terminal comprises a second processor, a second memory, and a second communication bus, wherein the first communication bus is configured to implement connection and communication between the first processor and the first memory;

the second communication bus is configured to implement connection and communication between the second processor and the second memory; and the first processor is configured to execute one or more computer programs stored in the first memory, and the second processor is configured to execute one or more computer programs stored in the second memory so as to implement the operations of the image processing method according to claim 15.

17. A storage medium, wherein the storage medium stores one or more computer programs, and the one or more computer programs can be executed by one or more processors, so as to implement the operations of the image processing method according to claim 15.

* * * * *